Aug. 11, 1931.  J. J. JAKOSKY  1,818,331
METHOD FOR DETERMINING THE CHARACTER OF ORE BODIES
Filed Aug. 21, 1928  6 Sheets-Sheet 1
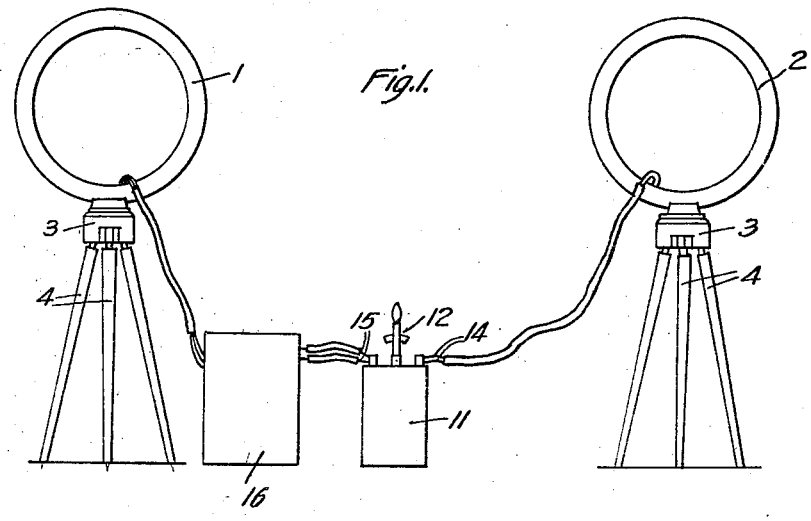
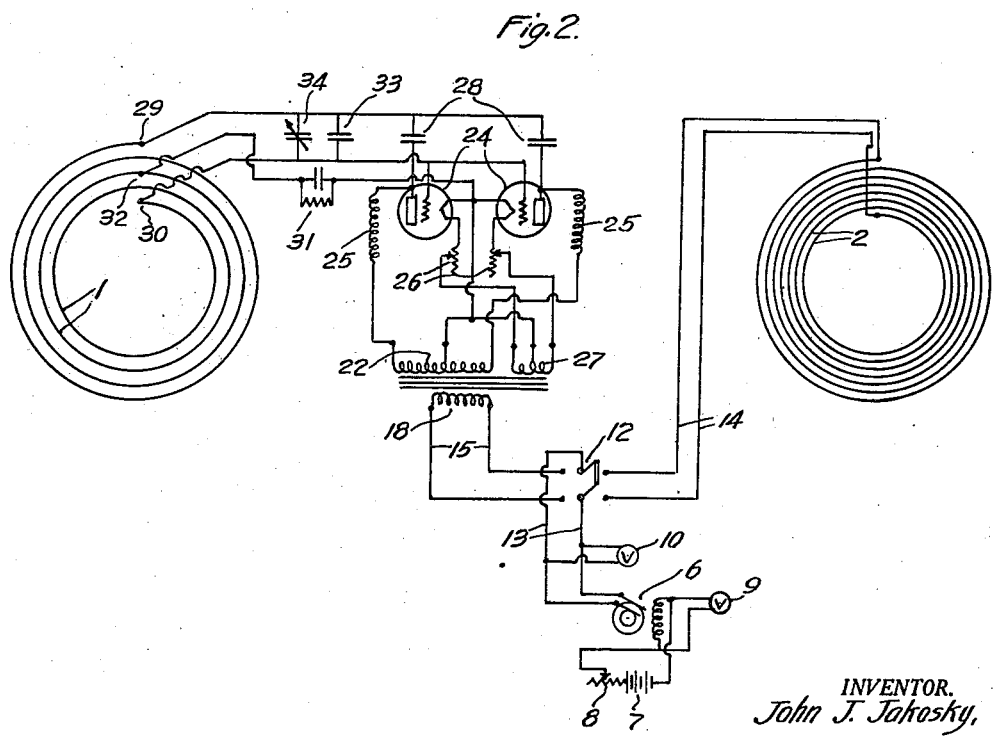
INVENTOR.
John J. Jakosky,
BY
ATTORNEYS

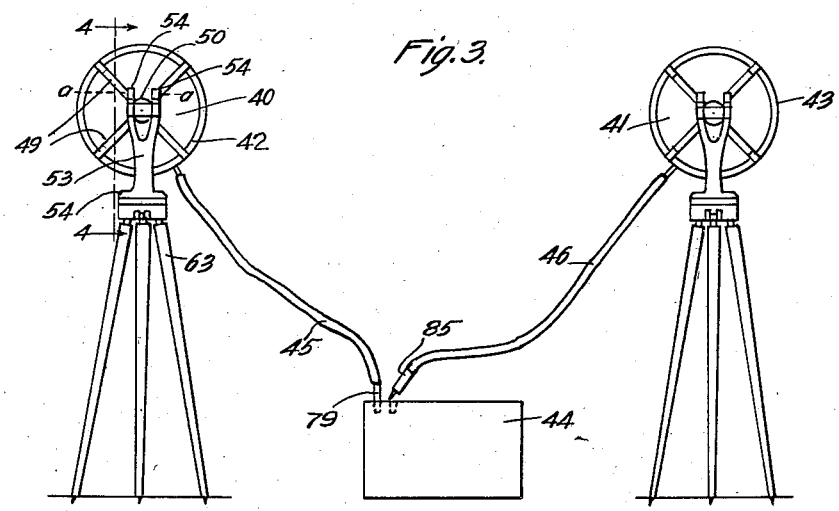
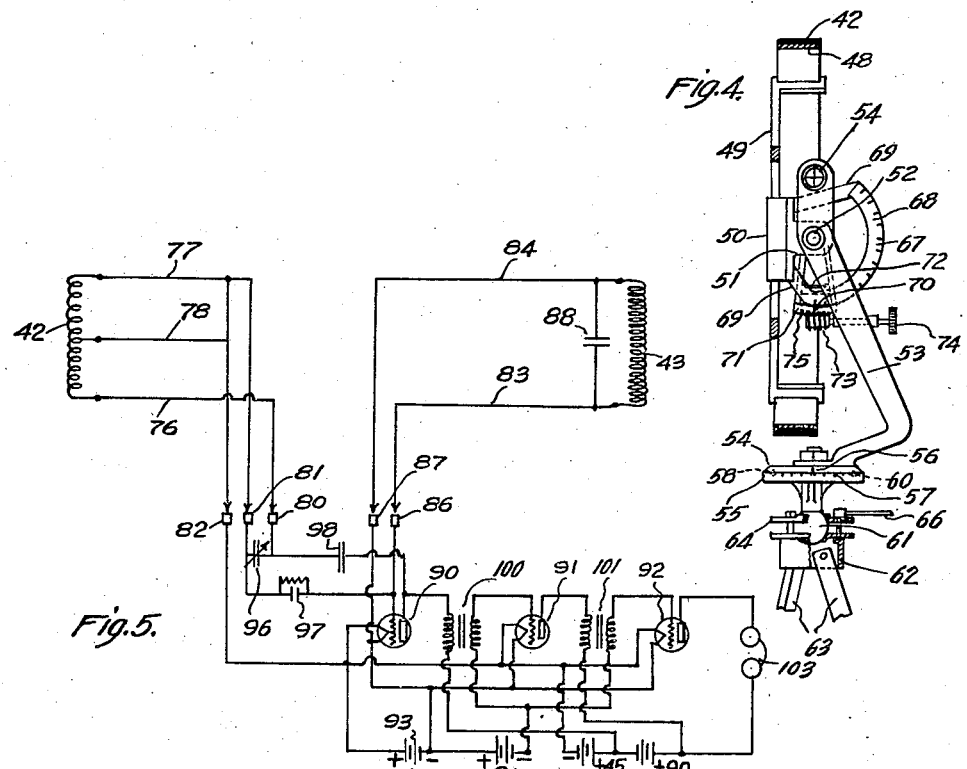

Aug. 11, 1931. J. J. JAKOSKY 1,818,331
METHOD FOR DETERMINING THE CHARACTER OF ORE BODIES
Filed Aug. 21, 1928   6 Sheets-Sheet 3
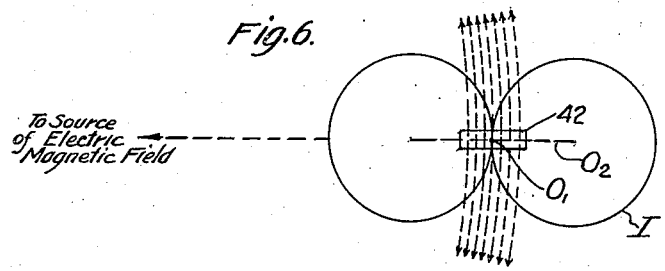
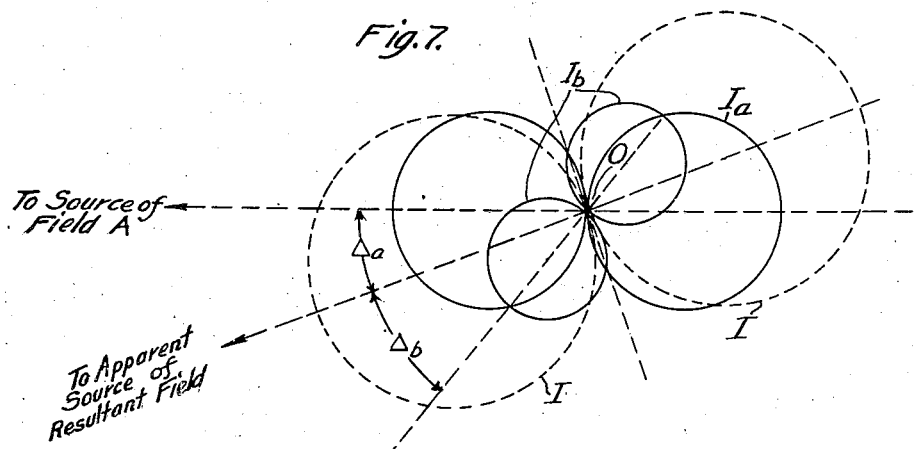
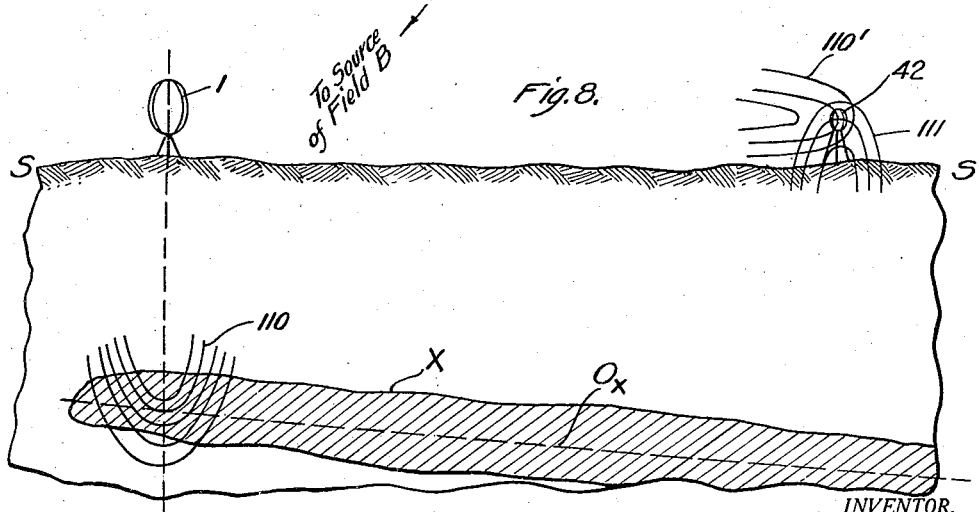
INVENTOR.
John J. Jakosky,
BY
ATTORNEYS

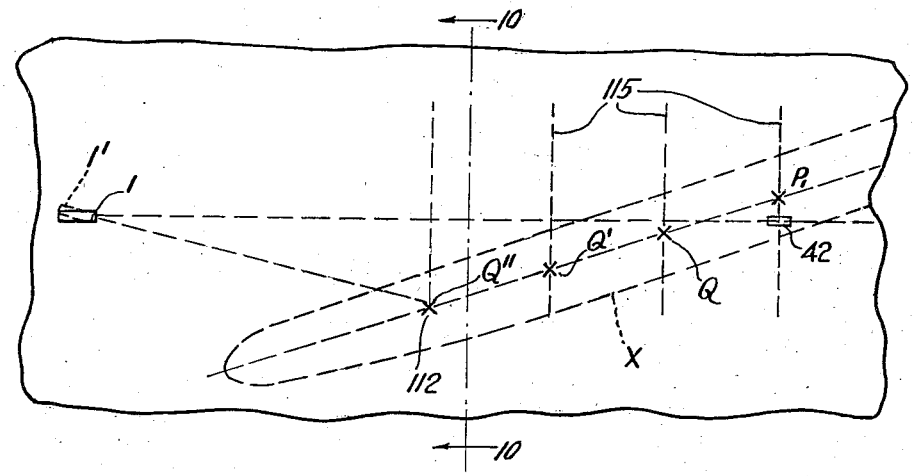
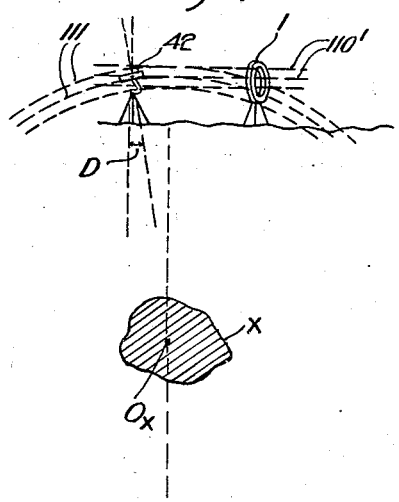
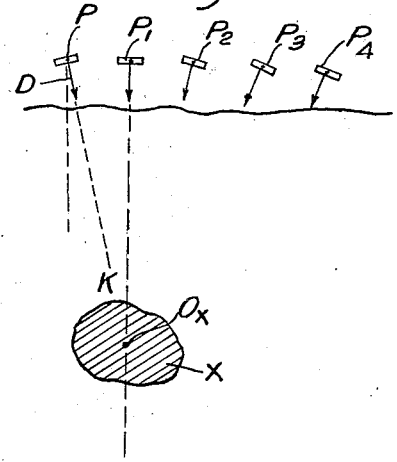

Aug. 11, 1931.   J. J. JAKOSKY   1,818,331
METHOD FOR DETERMINING THE CHARACTER OF ORE BODIES
Filed Aug. 21, 1928   6 Sheets-Sheet 6
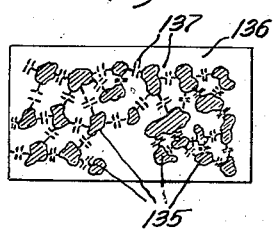
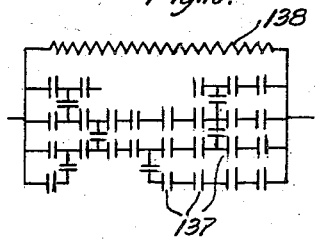
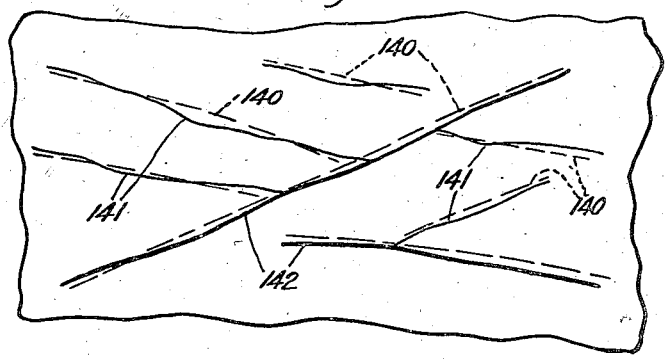
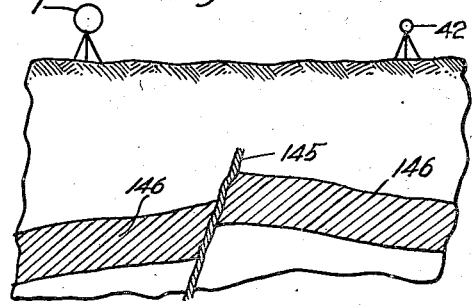
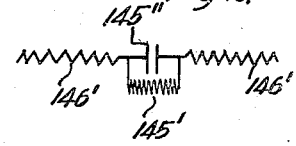
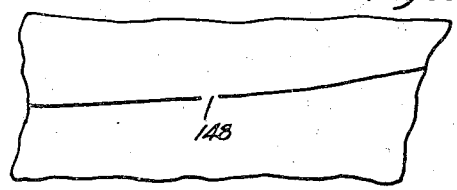
INVENTOR.
John J. Jakosky,
BY
ATTORNEYS Patented Aug. 11, 1931

1,818,331

UNITED STATES PATENT OFFICE

JOHN J. JAKOSKY, OF LOS ANGELES, CALIFORNIA, ASSIGNOR TO THE RADIORE COMPANY, OF LOS ANGELES, CALIFORNIA, A CORPORATION OF CALIFORNIA

METHOD FOR DETERMINING THE CHARACTER OF ORE BODIES

Application filed August 21, 1928. Serial No. 301,059.

This invention relates to electrical methods for obtaining information regarding underground ore bodies whose electrical conductivity is relatively high as compared with that of the surrounding rock or earthy material, and particularly by methods known as "inductive methods", this term being used to indicate that the current flow in the conductive ore body, which gives rise to the indications utilized to furnish the desired information regarding such ore body, is caused to flow by induction, rather than by direction conduction. The invention is applicable, however, to methods in which the current flow in the ore body is caused by direct conduction thereto, although I do not prefer to practice the invention in this manner as the inductive methods not only give more accurate and dependable results, but permit the exploration of a much larger area in a given time, and also permit exploration to a greater depth beneath the surface.

According to the inductive method for determining the location of ore bodies, a high frequency electromagnetic field (called the primary or energizing field) is established in the region to be explored by suitable energizing apparatus, for example by means of a loop or coil transmitter, which results in setting up an alternating electric current in any conductive body (such as an underground ore body) within such region and so disposed as to be cut by the lines of force of such field, said alternating current being of a frequency equal to that of the primary field and of a magnitude dependent upon the conductivity of the body at such frequency and upon the strength of the primary field at the position of the body, and said alternating current causing a secondary electromagnetic field of the same frequency to be set up, the axis of said secondary field being the axis of the current flow in the conductive body; indications as to the presence of any such secondary field and the direction of the lines of force thereof are then obtained, for example by rotating a direction-finding coil receiver about a suitable axis or axes at points distributed throughout a region adjacent the energizing loop and noting in each case the resulting variation in intensity of the signal received thereby, and the position of the conductive body is calculated or plotted by means of such indications.

The principal object of this invention is to provide a method and apparatus for not only determining the location of conductive ore bodies, but also obtaining information as to the physical character of such ore bodies, and particularly as to the continuity of mineralization therein.

A particular object of the invention is to determine whether the ore bodies located are of a massive mineralization, or whether they are more or less disseminated, or are broken or faulted.

With these objects in view the invention is based upon the fact that the relation between the electrical conductivity of an ore body and the frequency of current flowing therein is quite different in the case of a disseminated, broken or faulted ore body than in the case of a substantially continuous or massive ore body. The term "disseminated" is intended to designate an ore body consisting of a multiplicity of particles or fragments of conductive mineral material separated by a matrix of gangue material of relatively low conductivity, as distinguished from a continuous or massive mineralization in which the conductive mineral material extends in a substantially continuous or unbroken relation throughout considerable distances.

The impedance to alternating current of a conductor including considerable values of capacity is composed of both resistance and capacity reactance, and while the resistance is the same at high frequency as at low frequency, the capacity reactance varies inversely as the frequency and is, therefore, much lower at high frequency than at low frequency. The resistance of a disseminated ore body is relatively high, because of the high resistance of the gangue material interposed between the mineral particles, but an electrostatic capacity also exists between each mineral particle and each adjacent mineral particle, the ore body consisting in effect, as hereinafter explained, of a multiplicity of small capacities arranged in series multiple relation and shunted by a high resistance, and constituting, therefore, a conductor of the type just mentioned. The impedance of such an ore body at low frequency will, therefore, be relatively great, due to the high values of both the capacity reactance and the resistance, while at high frequency the capacity reactance will be relatively low and consequently a low impedance will prevail. As a result such an ore body will be much more conductive at high frequency than at low frequency, and indications of the presence and location of the ore body by the general method above described may be obtained at much greater strength or at much greater distances, when a high frequency energizing field is employed than when a relatively low frequency field is used. Similarly, in the case of a faulted or broken ore body, a capacity exists at the plane of the fault or break, so that little current will pass this plane at low frequency but a relatively high current flow across such plane will be permitted at higher frequency.

In the case of a continuous or massive ore body, on the other hand, the capacity effect will be present to only a minor extent or not at all, and the impedance will depend primarily upon resistance, which will be relatively low at both low and high frequencies, due to the continuity of the conductive material. With such an ore body, therefore, the relative strengths of indications obtainable at low frequency will be much more nearly equal to that obtainable at high frequency, than in the case of the disseminated, faulted or broken ore bodies above discussed.

The method of my invention, therefore, consists essentially, in conducting two electromagnetic surveys in the region adjacent the ore body, one at a relatively hight frequency, at which the capacity of the body plays an important part in the conductivity thereof, and the other at a relatively low frequency such that the conductivity is dependent primarily or substantially wholly upon the ohmic resistance of the body as a whole. According to the preferred embodiment of the invention both of these surveys are made by the inductive method as above outlined, and may if desired be conducted in conjunction with each other and with a single series of set-ups of the energizing and direction-finding apparatus, indications being obtained with suitable direction-finding receiving apparatus for alternately created primary fields of relatively high and relatively low frequency at each position of set up of such receiving apparatus.

The two surveys may, however, be conducted separately, in which case a complete survey of the area to be explored is preferably first conducted at a high frequency so as to locate all ore bodies within such area, whether of a continuous or discontinuous character, and surveys at low frequency are then made only at suitable joints adjacent the ore bodies thus located so as to obtain the desired information as to the character thereof.

The high frequency survey should as above stated employ an energizing field of such a frequency that the capacitative reactance of a disseminated ore body exercises a pronounced effect upon the conductivity thereof. Such high frequency should be above 10,000 cycles per second and may be considered in general as being within the range of what are ordinarily considered as radio frequencies. I have found, for example, that good results may be obtained with the use of frequencies between 20,000 and 60,000 cycles per second. Higher frequencies than this may of course be used, but the use of such higher frequencies introduces undesirable complications, due to "out-of-phase" relationship of primary and secondary fields, distortion of wave front, and other phenomena. For the low frequency survey, on the other hand, the frequency of the energizing field should be such that the conductivity of the ore body is dependent primarily upon the resistance thereof and may be considered as lying within the range of what are commonly considered audio frequencies, that is frequencies below 3,000 cycles per second. Preferably, an energizing field whose frequency is between 500 and 2,000 cycles per second may be employed in conducting this survey. It may be seen, therefore, that the frequency in the high frequency survey is preferably at least 10 times as great as in the low frequency survey.

The invention also includes certain advantageous apparatus for conducting the dual frequency survey in the manner first described, such apparatus including means for transmitting a primary field of relatively high frequency, other means for transmitting a primary field of relatively low frequency and means for alternatively energizing said transmitting means, preferably from a common source of current, and also includes direction-finding receiving means adapted to respond to the relatively high frequency field and additional direction-finding receiving means adapted to respond to the relatively low frequency field, and means whereby indications may be received alternatively by either of said receiving means and preferably by a common indicating means.

The accompanying drawings illustrate the apparatus of my invention and also assist in illustrating the method thereof, and referring to these drawings:

Fig. 1 is a side elevation of a form of dual transmitting apparatus, adapted to alternately create primary fields of relatively high and relatively low frequency.

Fig. 2 is a wiring diagram of the apparatus shown in Fig. 1.

Fig. 3 is a side elevation of a form of dual receiving apparatus adapted to alternately receive, and give indications of, high frequency and low frequency signals.

Fig. 4 is a section on line 4—4 in Fig. 3.

Fig. 5 is a wiring diagram of the apparatus shown in Fig. 3.

Fig. 6 shows a characteristic figure 8 curve representing the current induced in a direction-finding coil by an electromagnetic field.

Fig. 7 is a diagrammatic representation of the resultant current induced in a receiving coil by two component fields of different directions.

Fig. 8 is a diagrammatic vertical section of a portion of the earth's crust with an ore body therein, showing the relative positions of the energizing and direction-finding devices.

Fig. 9 is a plan view of the same illustrating one step in an inductive method of locating the ore body.

Fig. 10 is a diagrammatic section on line 10—10 in Fig. 9.

Fig. 11 is a diagrammatic representation of the indications obtained with the direction-finding coil in this step of the process, taken on the same plane as Fig. 10.

Fig. 15 is a diagrammatic representation of a section of a disseminated ore, illustrating the effect of capacity between the mineralized particles.

Fig. 16 is a diagrammatic representation of the electrical characteristics of a section of ore such as shown in Fig. 15.

Fig. 17 illustrates the comparative results of surveys made at high frequency and at low frequency.

Fig. 18 illustrates the effect of a faulted or broken ore body.

Fig. 19 is a diagrammatic representation of the electrical characteristics of such an ore body.

Fig. 20 illustrates the manner in which the fault is located by a combined high and low frequency survey.

Figure 12:
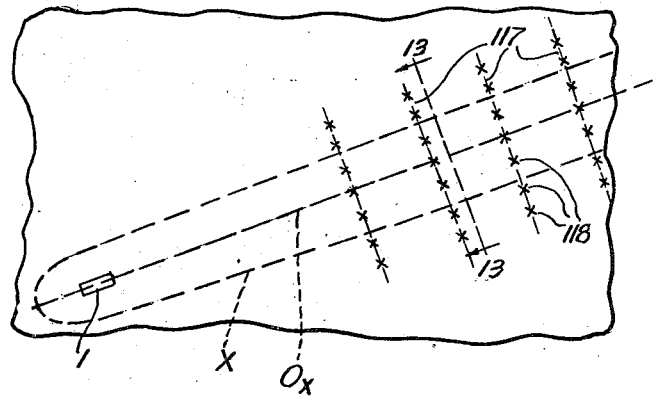
Fig. 12 is a plan view illustrating relative positions of the energizing apparatus and the direction-finding apparatus for the purpose of obtaining indications leading to the determination of the depth of the conductor, after the plan view location thereof has been determined.
Figure 13:
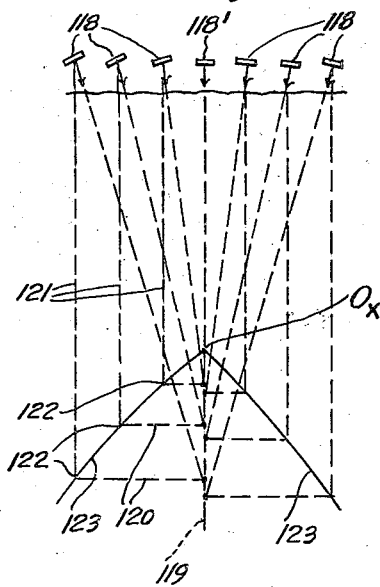
Fig. 13 is a section on line 13—13 in Fig. 12, illustrating the indications obtained in this part of the process and one method of plotting the same to determine the depth of the conductor.

The energizing apparatus shown in Fig. 1 comprises a relatively high frequency transmitting loop 1, and a relatively low frequency transmitting loop 2, each of said loops being mounted by means of a supporting base 3 upon a tripod 4, it being understood that said supporting base may, if desired, be provided with any suitable means for orientation and leveling of the respective loops. The high frequency loop comprises a relatively small number of turns of wire as indicated in Fig. 2, while the low frequency loop comprises a relatively large number of turns as also shown. Each of said loops may be wound upon any suitable supporting ring or frame and provided with any necessary covering or protecting means if desired, the exact construction of the respective loops and of the supporting means therefore forming no essential part of this invention.

Any suitable form of energizing circuit means may be used for producing the necessary relatively high frequency and relatively low frequency oscillations in the respective transmitting loops. An advantageous form of apparatus for this purpose, which is adapted to employ a common source of current and to alternately supply oscillating or alternating current of the desired frequency to the respective loops, is illustrated in Figs. 1 and 2. Such apparatus comprises an alternator, indicated at 6 which may be hand driven or power driven, and which may be excited by current supplied by battery 7. Rheostat 8 may be provided for regulating the excitation of the alternator, and voltmeters 9 and 10 may be provided for indicating respectively the exciting voltage and the output voltage. The above described alternator may be located in a box or casing as indicated at 11 in Fig. 1 and a switch 12 may be provided for connecting the output wires 13 of the alternator either through wires 14 to the ends of the low frequency loop 2 or through wires 15 to the input of suitable oscillating circuit means which may be located in a box or casing such as indicated at 16 in Fig. 1, said oscillating circuit means being connected to the high frequency loop as hereinafter described. The alternator may be adapted to deliver alternating current of any suitable relatively low frequency, for example a frequency of about 1000 cycles per second or between the range of 500 to 2000 cycles per second. When said alternator is connected by switch 12 to the low frequency loop, alternating current of this frequency flows through said loop and sets up an electromagnetic field of equal frequency surrounding said loop.

The oscillating circuit for producing the relatively high frequency oscillations may be of any suitable type, comprising, for example, as shown in Fig. 2, an input transformer whose primary winding 18 is connected to the wire 15 aforesaid. The center of the secondary winding 22 of said transformer is connected to the filaments of thermionic tubes 24, each of which comprises in addition to said filaments the usual plate and grid means of the ordinary three-electrode thermionic tube. The ends of the secondary winding of said transformer are connected through choke coils 25 to the plates of the respective thermionic tubes. The filaments of both tubes may be connected through adjustable resistance means 26 to a separate secondary winding 27 of the transformer adapted to supply current for heating such filaments. The plates of said tubes may be connected through plate stopping condensers 28 to one of the end connections 29 of the loop 1, while the grids may be connected to the other end connection 30 of said loop. A connection is also provided from the filaments through grid leak and condenser 31 to the intermediate connection 32 of the loop. Means are preferably provided whereby the connections 29, 30 and 32 may be adjusted on the loop so as to include any desired number of turns of wire between these respective connections. Tuning of the loop circuit to give the desired frequency of oscillation may thus be accomplished partly by varying the inductance of the loop and partly by means of loading condenser 33 and variable tuning condenser 34 which are connected as shown between the end connections of the loop.

While I have described one particular type of circuit for producing high frequency current it will be understood that any other suitable means may be employed for this purpose.

For the purpose of determining the presence and obtaining indications as to the direction of any secondary electromagnetic field about a conductive body in the area being explored and hence determining the location of such body, I prefer to employ a direction-finding apparatus comprising a coil or loop antenna mounted upon a tripod or other supporting means and provided with means for orienting and leveling the same and for permitting rotation thereof about a suitable axis or axes and measuring the angular position of the coil about such axis or axes.

An advantageous form of apparatus for this purpose, in conducting a combination survey at both high and low frequencies, is shown in Figs. 3 to 5 inclusive, and comprises a high frequency direction-finding device 40 and a low frequency direction-finding device 41, provided respectively with coil antennæ 42 and 43, and suitable receiving circuit means located in box or housing 44 and adapted to be connected either by cord 45 to the high frequency antenna 42 or by cord 46 to the low frequency antenna 43.

In each of the direction-finding devices, the antenna coil, such as 42, may be wound upon a supporting ring 48 of wood, bakelite or other suitable material of low conductivity. The coil 42 is composed of a relatively small number of turns, sufficient to intercept, in combination with the tuning means hereinafter described, a sufficient amount of energy from the relatively high frequency electromagnetic field produced by the transmitting loop or by the unknown conductor, or both, for the purposes of detection and accurate indications of directions. The low frequency coil 43 consists of a relatively large number of turns in order to intercept a sufficient amount of energy from the low frequency field or fields, due to the fact that the current induction is much less at low frequency than at high frequency, as expressed by the equation, (1): $e = 2\pi M f I$, where $e$ = induced E. M. F.
$M$ = mutual inductance of transmitter and receiver.
$f$ = frequency.
$I$ = current flow in transmitter.

Each of the receiving coils above described may be supported at the ends of arms 49 extending outwardly from the central supporting plate 50, as shown in Fig. 4. Said plate may be provided with bearing lugs 51 by means of which it is rotatably mounted on shaft 52 adjacent the upper end of a supporting yoke 53. Suitable sighting means 54 may also be provided on said yoke, whereby the axis of shaft 52 may be aligned in the desired direction. Yoke 53 is secured to a ring or plate 54 which may be rotatable about an axis perpendicular to the axis of shaft 52, with respect to a lower ring or plate 55. One of said plates may be provided with a mark 56 cooperating with an angular scale 57 on the other plate for indicating the angular position of the coil about the last mentioned axis of rotation. Any suitable means may be provided for holding or clamping the plates 54 and 55 together in different angular positions, such means comprising, for example, a ball or catch member 58 in upper plate 54, pressed downwardly as by a small spring (not shown) and adapted to engage in any one of four recesses 60 spaced 90° apart in plate 55. The lower plate is provided with a ball 61 held between a lower clamping plate 62 mounted at the upper ends of tripod legs 63, and an upper clamping plate or ring 64, so as to provide for universal adjustment of the entire head of the device upon the supporting tripod. Three bolts may be provided for clamping ball 61 between plates 62 and 64, one of said bolts being preferably provided with a handle 66 whereby the same may be loosened sufficiently to permit such adjustment and may be quickly tightened to hold the device in the desired position.

In order to measure the angular position of the coil about the axis of shaft 52, with respect to a vertical plane passing through said axis, an angular scale 67 is provided on an arc-shaped member 68 secured to plate 50 by means of arms 69. Said scale cooperates with a vertical mark 70 on segment 71 which is independently rotatable about shaft 52. Said segment is provided with a leveling bubble device 72 and with means for adjustment to bring mark 70 to vertical position, said adjusting means comprising, for example, a worm 73 operated by knob 74 and engaging a set of teeth 75 on said segment.

As shown in Fig. 5, the connecting cord 45 for the high frequency coil 42 may comprise wires 76 and 77 connected to the end terminals of said coil and a wire 78 connected to the midpoint thereof, said wires being connected at their other ends to a suitable jack or plug device 79 (shown in Fig. 4) adapted, upon insertion in a socket in box 44, to connect said wires respectively to contact members 80, 81 and 82. The connecting cord 46 for the low frequency coil 43 may comprise wires 83 and 84 connected to the respective ends of said coil, and connected at their other ends to a suitable jack or plug device 85 adapted to connect said wires respectively to contact members 86 and 87. A condenser 88 may be connected between the end terminals of coil 43 so as to tune the circuit of said coil to the frequency of the relatively low frequency field to be employed.

One form of receiving circuit, which may be employed in conjunction with both the high frequency and low frequency receiving coils, is shown in Fig. 5. Such circuit comprises three thermionic tubes 90, 91 and 92, each provided with the usual filament, grid and plate. Suitable means, such as A battery 93, B batteries 94 and C battery 95, are also provided for supplying the current necessary for heating the filaments of said tubes, for energizing the plate circuits thereof, and for supplying the necessary bias to the grid circuits of the last two tubes. The contact members 80 and 81 are connected respectively to the plate and grid of thermionic tube 90. A tuning condenser 96 is connected between said contact members, while the usual grid condenser and grid leak are included in the grid connection as indicated at 97 and a plate condenser 98 is included in the plate connection. The third contact member 82 may be connected to the positive filament terminal of thermionic tube 90 as shown. Audio frequency transformers 100 and 101 are provided, the primary windings of said transformers being connected in the plate circuits of tubes 90 and 91 respectively and the secondary windings thereof being connected in the grid circuits of tubes 91 and 92 respectively. A suitable electric current indicating device, such as a pair of telephone receivers indicated at 103, is connected in the plate circuit of tube 92. The circuit above described constitutes a well known form of detecting and amplifying circuit, and it will be understood that any other suitable form of circuit may be substituted therefor. The same circuit may also be used as a three stage amplifying circuit for the low frequency coil 43, the contact members 86 and 87 being connected respectively to the grid and negative filament terminals of tube 90 for this purpose.

It will be seen that at any particular set up of the transmitting apparatus above described, the alternator may be set in operation and the switch 12 first thrown to position to cause energization of one of the transmitting loops and then to position to cause energization of the other loop so as to alternatively set up primary electromagnetic fields of relatively high frequency and relatively low frequency. Similarly, at each set up of the direction-finding apparatus the plug devices 79 and 85 may be alternately inserted so as to make the current indicating device 103 responsive to signals received alternately by the high frequency coil and the low frequency coil, it being understood that the connection of the respective coils to the receiving and indicating means will be timed to correspond to the energization of the corresponding transmitting loops.

For the purpose of clearly outlining the laws governing the action of a coil used for direction-finding purposes, reference is made to Fig. 6, which shows the characteristic curve of the intensity of current induced in a receiving coil, such as coil 42, by a single electromagnetic field whose source is in the direction indicated, as the coil is rotated through 360° about an axis $O_1$, perpendicular to a plane embracing the source of the field and the direction of the magnetic lines of force at the position of the coil. The direction of the magnetic lines of force is indicated by the curved arrows. It is well known to those versed in the art that for the condition of maximum current induction, and hence of maximum signal intensity, the plane of the coil extends in the position shown, namely, in a direction toward the source of the electromagnetic field, while for any other position of the coil the current induction follows the figure 8 curve shown at I. This is due of course to a variation in the total flux through the coil, the position of maximum signal intensity being that at which such flux is a maximum. If, on the other hand, the coil be turned to the position shown and then rotated about an axis $O_2$ perpendicular to the axis $O_1$ and extending toward the source of the field, it will be found that as the plane of the coil deviates from the position perpendicular to the magnetic lines of force of the field, the current intensity also decreases and follows a similar figure 8 curve. The coil, therefore, when rotated about an axis pointed toward the source of the field indicates by its position at the time of maximum signal intensity the direction of the magnetic lines of force of the field, at the coil. If, for example, the field is vertically polarized, or if the lines of magnetic force are horizontal or tangent to the horizontal at the position of the coil, Fig. 6 may be considered as a plan view, and the coil indicates by its position at the time of maximum signal intensity not only such direction of polarization or the direction of the lines of magnetic force, but also the direction toward the source of the field. If the lines of magnetic force were not tangent to the horizontal at the position of the coil, indicating an apparent non-vertical polarization of the field, then rotation of the coil about a horizontal axis pointing toward the source of the field would give a maximum current induction when the plane of the coil extended in a direction perpendicular to the magnetic lines of force and would thus indicate the direction of such lines of force at the coil. It will be seen, therefore, that a coil receiver may be used to indicate both the direction from the coil toward the source of the field and also the direction of the lines of force of the field at the coil, by simply rotating the same about suitable axes and noting the variation in intensity of signal reception thereby.

It may be noted here that, in actual practice, it is customary, instead of directly determining the position of the coil for maximum current induction, to note the direction indicated by the position of minimum current induction (minimum signal intensity), and then take as a direction of maximum a direction which under ideal conditions is perpendicular to the minimum. This is for the reason that the minimums are generally much sharper than the maximums, and more accurate results are thus obtained. Without the presence of the so-called "antenna effect" the minimums will occur 180° apart and hence the indicated direction toward the axis of the field will be 90° to either minimum. The antenna effect, however, often tends to make the minimums broad instead of sharp and also tends to cause the minimums to occur other than 180° apart (less than 180° in one direction and greater in the other). In determining the direction of electromagnetic fields for the purpose of this invention, it is highly essential that such "antenna effect" be recognized and compensated for, or eliminated or reduced as far as possible, and for this purpose care must be exercised in the design of the coil and its auxiliary apparatus. This antenna effect, together with its influence in broadening or displacing the minimum readings obtained by a coil, and methods of eliminating it, are outlined in Bureau of Standards Scientific Paper No. 428, pages 541 to 544.

While that paper deals particularly with the antenna effect when a single field is imposed upon the coil, it has been found that the methods of elimination of antenna effect therein outlined also give satisfactory results when two or more fields are imposed on the coil, as by the inductive method of locating ore bodies, and these or other methods of prevention should, therefore, be followed in all cases in order to secure the most accurate results.

In Fig. 7 is represented the curve of resultant current induced in a coil by two electromagnetic fields A and B, which are in phase with one another and are identically polarized or whose magnetic lines of force either lie in or are tangent to the same plane perpendicular to the axis of the coil at O, but whose sources are at different directions from the coil. In this figure, $I_a$ represents the current curve which would be produced by the field A, and $I_b$ that which would be produced by the field B. The resultant current curve, for a condition when the fields are of identical frequency and when the currents induced thereby in the coil are in phase, is shown in dotted lines at I, and indicates, as shown, the direction toward the apparent source of an imaginary field which would produce the same effect upon the coil. The angles of apparent distortion in the direction of the respective fields due to the effect of the other field, are indicated at $a$ and $b$. A difference in direction of lines of force of the two fields at the position of the coil, due to a difference in polarization thereof, would have a similar effect upon the current curve obtained upon rotation of the coil about an appropriate axis. It may, therefore, be seen that if a plurality of readings be taken with a coil in a region in which such coil is subject to the action of two electromagnetic fields whose sources lie at different directions from the coil and whose magnetic lines of force extend in different directions, then if the direction toward the source of one of the fields and the direction of its magnetic line of force are known, the location of the axis of the other field may be calculated. It will be understood that in the actual cases usually encountered in the location of underground conductive bodies the direction of the lines of force of the primary field and of the secondary field at the point of measurement are not generally such as to correspond to fields of identical polarization so that the problem is somewhat more involved than the simple case above outlined, but nevertheless such a problem may be readily solved by the procedure hereinafter outlined.

It is also evident from Fig. 7 that the apparent direction indicated by the resultant current curve obtained with a coil is dependent not only upon the directions of the two fields, but also upon the relative intensities thereof at the position of the coil. In said figure, for example, such apparent direction is nearer to that of the larger field A whose current curve is shown at $I_a$, than to that of the smaller field B. In other words, the apparent distortion in direction $a$ of the larger field is less than the apparent distortion in direction $b$ of the smaller field. In order, therefore, to obtain the most accurate indications of the direction of the secondary field surrounding an unknown conductor, it is necessary that the strength of such secondary field at the point of observation be as great as possible as compared with the primary or energizing field used to induce the flow of current in such conductor. For this reason it is preferable to employ a loop transmitter, for example such as above described, and to maintain the plane of the loop vertical, and in making the final or most accurate survey, to place the loop in a position substanitally over the approximate location of the conductor, in such manner that a maximum current induction in the unknown conductor is obtained, accompanied by a maximum relative strength of secondary field surrounding the same.

For the same reason, it is desirable to make observations with the direction-finding coil at distances from the energizing loop, along the length of the conductor, which are relatively great as compared to the depth of the conductor, because the strength of primary fields decreases much more rapidly with such distance than does that of the secondary field, because the current induced in the unknown conductor directly below the energizing loop will travel for great distances along said conductor, and will create a secondary field throughout the length of such travel. So far as the secondary field is concerned, therefore, the receiving coil is affected to substantially the same extent as though it were above the same portion of the conducting body as is the transmitting loop, but it is much less affected by the primary field, due to the distance through which such primary field travels before reaching the receiving coil. As is well known, the strength of the induction component of an electromagnetic field varies inversely as the square of the distance from the source, while the radiation component varies inversely as the distance. Since at the short distances ordinarily involved in the practice of this method, the induction component constitutes the major portion of the total field, it will be seen that the effect of distance upon intensity of the field is quite important.

I will now describe the general principles upon which the inductive method of electrical prospecting is based and the preferred manner of carrying out such method, particularly when conducting a dual-frequency survey in accordance with my invention. Figs. 8 to 10 inclusive show a typical relationship of a transmitting loop indicated at 1, an ore body indicated at $x$ and a direction-finding receiver at 42. The surface of the earth is indicated at S—S. It is evident that under the conditions shown, if the electromagnetic lines of force of the primary field set up by the loop 1 cut the conductive ore body $x$, as indicated, for example, at 110, an alternating current will be induced in said ore body, such current flow being centralized about the electrical axis $O_x$ of the conductive body. Such induced current will in turn set up a secondary electromagnetic field whose lines of force will cut the coil 42 as indicated at 111. Such coil will also, however, be cut by the lines of force of the primary field as indicated at 110'.

In conducting a survey the transmitting loop is maintained vertical and is directed toward the position of the coil for each observation. That is, with the coil at a position such as indicated at 112 in Fig. 9, the loop would be turned as shown at 1' so as to be directed toward such position of the coil. Also at each position of the coil the same is set up with the line of sight through the sighting means 54, as indicated at $a$—$a$ in Fig. 3, aligned directly toward the center of the energizing loop. If the receiving coil be then rotated about this axis, and if it is in the presence of the primary field alone, owing to the absence of conductive bodies in the vicinity, an indication of minimum signal strength will be obtained when the coil is in a horizontal position, due to the fact that the lines of force of the primary field are horizontal or tangent to the horizontal at the position of the coil. If, on the other hand, an electrical conductor such as $x$ is present, the lines of force 111 will cut the coil at some direction other than horizontal, except for a position of the coil directly above the axis $O_x$. For example, at the position of the coil indicated at 42 in Fig. 10 the lines of force of the primary field, shown at 110', are horizontal, but those of the secondary field, shown at 111, are not horizontal. The primary and secondary fields will both influence the receiving coil, the proportional effects thereof depending upon the relative strengths of such fields at the position of the coil, and the coil will give a minimum indication when in some position other than horizontal, as shown. The plane of the coil for maximum signal reception would be found to be perpendicular to its position for minimum reception, but for the reasons above stated the maximum position is taken as 90° from the observed minimum position rather than by direct observation.

The angle such as indicated at D, between this position of the coil for maximum signal reception and the vertical (or between such position and the horizontal) is measured by means of scale 67. Such readings are commonly known as "dip" readings or angles. The direction of the line PK, indicated by the dip reading D in Fig. 11, indicates that the conductive body lies somewhere to that side of the vertical plane through the point P, and the magnitude of such dip reading gives some indication as to the direction toward such conductive body. It should be borne in mind that if the axis a—a about which the coil is rotated is other than horizontal, as will generally be the case except in perfectly level country, the dip readings are not in a vertical plane but rather in a plane perpendicular to such axis.

In practice, I prefer to first conduct a preliminary or "reconnaissance survey" of the region to be investigated, in order to determine the general plan view location of the conductive bodies in such region, and to then conduct a more accurate survey or "final survey" over each of the conductive bodies thus located, in order to more accurately locate the same and determine the depth thereof. In conducting a preliminary or "reconnaissance survey" of a certain region a plurality of traverses such as indicated at 115 in Fig. 9 may first be laid off perpendicular to a line extending from the loop 1 to the central part of the region to be explored. If the direction-finding apparatus is then set up at a plurality of suitably spaced points P, $P_1$, $P_2$, etc. on each of such traverses, a set of dip readings, such as shown in Fig. 11, will be obtained. The vertical dip reading obtained at $P_1$, between points of downwardly converging dips at either side thereof, indicates approximately the plan view location of the conductor beneath this particular traverse, and the several points of vertical dip thus found on the several traverses such as indicated at $P_1$, Q, Q' and Q'' give an approximate indication of the plan view of the axis of the conductor. In making such a preliminary survey of a large area, the energizing loop is set up successively at a plurality of points spaced at suitable intervals throughout such area, and for each such set up of a loop a series of observations are made with the direction-finding apparatus in areas spaced a suitable distance from the transmitting loop in one or more directions. The approximate plan view locations of the axes of any conductive bodies within such region may be located in this manner. If desired, a preliminary survey may be conducted with energizing fields of both high and low frequency, using, for example, the form of energizing apparatus and of direction-finding apparatus above described, but I prefer in general to employ only relatively high frequency during the preliminary survey so as to enable such survey to be conducted with the greatest rapidity, for the sole purpose of determining the approximate plan view location of all conductive bodies, whether the same are conductive to low frequency current or not. It has been found in practice and may be shown by theory that any bodies which are sufficiently conductive at low frequency to give indications in the use of this method, will give much stronger indications at high frequency.

That this is true may be shown from the following considerations. Other things being equal, a high frequency means a high induced E. M. F., not considering the decrease in magnetic intensity due to absorption of the magnetic field by the over burden. This is shown by the above Equation No. 1. If the conductivity of the overburden is appreciable there might appear to be a question of whether the increase in the induced E. M. F. by the use of higher frequencies more than compensates for the decrease due to absorption. In order to answer this question we may consider the theoretical absorption equation:

$$(2): H = {_o}He - 2\pi\sqrt{\frac{f}{\sigma}}Z$$

where
H = the magnetic intensity at any depth $z$
$H_o$ = the magnetic intensity at the surface
$f$ = frequency
$\sigma$ = specific resistance of overburden.

If we assume a depth of 100 feet (3048 centimeters) and a comparatively low value of specific resistance for the overburden, such as 10,000 ohms per cubic centimeter, then at a frequency of 10,000 this equation indicates an intensity at that depth equal to 52% of the intensity at the surface. If the frequency be increased to 50,000 the intensity is 26% of that at the surface. Thus increasing the frequency five times only doubles the absorption. If this relationship be introduced into the Equation No. 1, $e = 2\mu\pi MfI$, it will be seen that $e$ has been increased 2.5 times by a five fold increase in frequency. As a matter of fact the increased effect due to high frequency is generally much greater than this; and particularly in the case of disseminated, broken or faulted ore bodies, whose conductivity at high frequency is many times greater than at low frequency, due to the capacity effect above mentioned, it may be seen that the induced current in the conductive body and hence the secondary electromagnetic field is very materially greater at high frequency than at a low frequency. Furthermore, in desert countries the overburden is extremely highly resistant, making absorption neglible and thus still further increasing the relative effectiveness of the high frequency field.

It is true that during this first or preliminary survey the position and direction of the energizing loop is arbitrarily selected and its relation to the axis of adjacent conductive bodies is unknown so that the lines of force of the primary field do not, in general, cut the axis of the conductor squarely. However, by employing a suitable number of set ups of the transmitting loop and varying the direction thereof it is possible to obtain sufficient induction of current in any large conductive body at not too great a depth to permit dip readings of sufficient accuracy to give at least approximate indication. While these readings are somewhat inaccurate, the positions at which vertical dips are obtained, accompanied by converging dips at points at either side thereof, indicate that the axis of a conductive body lies approximately beneath these points, and the horizontal projections or plan view locations of such axes may, therefore, be plotted.

I then proceed to make a final or detailed survey, based on the approximate knowledge thus obtained. As illustrated in Fig. 12, in making this final survey the energizing loop 1 is in each case set up at a position directly or substantially over the position of the axis of a conductive body, as determined by the preliminary survey. At suitable intervals along the direction of said axis, a series of traverse surveys are made, as upon the lines 117, perpendicular to the direction of $O_x$. At each traverse the direction-finding coil is set up at a plurality of spaced points 118 extending to a considerable distance to either side of the indicated approximate locations of the conductor, and "dip" readings are again taken. In this final survey, as in the reconnaissance survey, the energizing loop is maintained in a vertical plane directed toward the direction-finding coil and the direction-finding coil is rotated about an axis extending in the true direction toward the center of the energizing loop.

Upon each traverse 117 a set of dip readings, such as indicated at the points 118 in Fig. 3, are obtained and these dip readings may be plotted as shown in said figure to indicate the location of the axis of the conductive body, or such location may, if desired, be determined by mathematical calculations. The vertical dip at the point 118' gives a more accurate indication of the plan view location of the axis at the position of this traverse. The approximate depth may be determined graphically by the following method: If the other dips are projected to intersect the vertical line 119 drawn through the point 118', and horizontal lines 120 are drawn through these points of intersection, so as to intersect the verticals 121 drawn through the corresponding points 118, a series of points 122 may be located at each side of the vertical 119. Two curves 123 may be drawn through the points thus determined and the point of intersection of said curves with the vertical 119 gives an approximate indication of the depth of the axis $O_x$ beneath the point 118'. If the two curves 123 do not intersect the vertical 119 at the same depth, the average of the two depths of intersection may be taken. For certain reasons, as explained in an article on "Fundamental Factors Underlying Electrical Methods of Geophysical Prospecting" by John J. Jakosky in Engineering and Mining Journal, February 11 and 18, 1928, the indications obtained by this method of plotting are not theoretically strictly accurate, but under the conditions usually encountered the results are sufficiently close for practical purposes.

Figure 14:
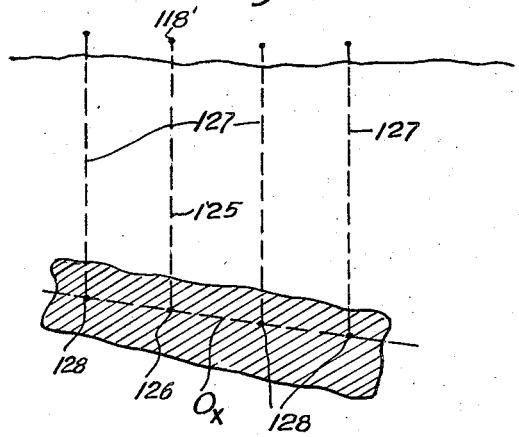
Fig. 14 illustrates the method of plotting the indicated depths of the conductor at different points along the length thereof, to locate the profile of the electrical axis thereof.

The depth thus indicated may be plotted in a vertical plane extending longitudinally of the conductor, this depth being represented by the line 145 in Fig. 14, so as to locate a point 126 upon the axis of the conductor. It should be borne in mind, however, that the depth 125 is not necessarily vertical, but is perpendicular to the axis of rotation of the direction-finding coil, and it is only vertical in case such axis of rotation is horizontal, that is, in case the direction-finding coil and the energizing loop are at the same level. The dip readings obtained upon the other traverses 117 may be plotted in similar manner and the depths of the axis $O_x$ beneath the points of vertical dip on the several traverses may be similarly determined and plotted as shown at 127, thus locating other points 128 on the axis $O_x$. A line may then be drawn through the points 126 and 128 so as to give a vertical projection or profile view of the axis of the conductive body.

It is during this final survey that I prefer to employ energizing fields of widely differing frequencies, for the purpose of determining the structure or characteristics of the ore bodies. The entire procedure, in its preferred form, therefore consists in first making a preliminary or reconnaissance survey at relatively high frequency, say 20,000 cycles or more, for the purpose of determining the approximate plan view location of all large and well-defined conductive bodies in the region under investigation; and then making two final or detail surveys of each conductive body thus located, one of said final surveys being at a relatively high frequency of, say, 20,000 cycles or higher, and the other at a relatively low frequency of, say, 500 to 2,000 cycles. These two final surveys may be conducted either simultaneously or successively. When conducting the same simultaneously, energizing means such as shown in Figs. 1 and 2, and direction-finding means such as shown in Figs. 3 to 5 inclusive may advantageously be used, as above described, while if such surveys of different frequency are conducted successively any suitable form of energizing and direction-finding means may be employed, a complete survey of any desired portion thereof being first made at one of said frequencies, and then at the other frequency.

The high frequency final survey enables the plan view location of each conductive body formed in the preliminary survey to be more accurately determined, and also indicates the depth or profile view thereof, while the low frequency survey gives valuable information as to the nature of such bodies, as will be now explained.

Some ores, such as chalcopyrite and iron pyrite, occur commonly in a massive state, and have practically the same conductivities for direct current as for alternating current. On the other hand, ores of certain structure, and particularly disseminated ores, exhibit quite different properties in the two cases. Such a disseminated ore may be considered as composed of small electrically conducting particles of mineral material, indicated at 135 in Fig. 15, distributed in a matrix 136. As a rule, this matrix consists of calcite, quartz and the like and has a low electrical conductivity—that is a high resistance. If, however, two conducting particles or masses are separated from one another by a substance of high resistance, an electrostatic capacity will exist between these two particles, such capacity being dependent upon the area of the particles, the distance between the particles and the dielectric constant of the separating medium (in this case the matrix material). In the case of the disseminated ore, therefore, a capacity exists between each mineral particle and adjacent particles, as indicated at 137. Such an ore may, therefore, from an electrical point of view, be considered as a relatively high resistance 138 shunted by a large number of these small capacities 137, connected in series multiple relationship, as illustrated in Fig. 16.

The electrical reactance or opposition to current flow offered by a condenser may be expressed by the following equation:

$$(3): X = \frac{1}{2\pi f C}$$

in which
X = reactance in ohms.
$f$ = frequency in cycles per second
C = capacity in farads It can, therefore, be seen that the reactance offered by a disseminated ore body to an alternating current will vary with its effective capacity and the frequency of the impressed current. The foregoing assumes no electrical conductivity for the matrix or gangue. Calcite, quartz, and other minerals which constitute the gangue for many ores become electrically conducting because of their moisture and impurities.

The actual electrical conductivity of an ore may be stated in an elementary or comparative way as dependent upon two factors—(1) the direct current conductivity and (2) the alternating current conductivity. Alternating current conductivity is the reciprocal of the impedance, a factor which is dependent on the physical or electrical constants of the circuit, in this case resistance (which is largely in the matrix) and the reactance due to capacities. It is the value of the impedance which limits the current flow for a given impressed E. M. F. The following formula expresses the relationship of these quantities:

$$(4): Z = \sqrt{R^2 + X^2 + K(K')}$$

in which Z = impedance in ohms
R = resistance in ohms
X = reactance in ohms
K and K' = constants dependent upon current distribution and frequency It may be seen, therefore, that since the impedance to alternating current is made up of resistance and reactance, and since the resistance is independent of the frequency while the reactance varies inversely as the frequency, the impedance of such a disseminated ore body will be very much less at high frequency than at low frequency. Therefore, the primary field of low frequency will be much less effective in inducing current flow in such an ore body than will the primary field of relatively high frequency. Ore bodies of this character may, therefore, frequently give strong indications in surveys such as above described when high frequency is employed, but fail entirely to give indications when a low frequency field is employed. In other cases where the degree of dissemination is not so great or where the conductivity of the matrix material is somewhat greater, or when for any other reason the difference between high frequency and low frequency conductivity is not so marked, indications may be obtained at both frequencies but those at high frequency will be much stronger than at low frequency. In the case of massive ore bodies, on the other hand, such as the chalcopyrite and iron pyrite deposists above referred to, the indications obtained at low frequency will be much more nearly equal in strength to those obtained at high frequency, subject of course to the fact above pointed out that the low frequency field is actually less effective in inducing current flow in the conductive body than is at high frequency field, even when the conductivity of such body is substantially the same at both frequencies. For the above reason many ore bodies which show up in the high frequency survey will either fail entirely to show up in the low frequency survey or will give much weaker indications, and by comparing the results of the two surveys, and particularly the relative intensities of indications obtained at the respective frequencies, valuable conclusions may be drawn as to the character of mineralization in these different ore bodies.

The results obtained by the above described method of survey, and the interpretation of such results are illustrated in Fig. 17. In this figure the dotted lines 140 illustrate the approximate plan view locations of the several conductive bodies in this area as determined by the preliminary survey, while the solid lines 141 and 142 indicate the more accurate plane view locations of such conductive bodies as found by the final survey. The heavier black lines 142 designate the location of conductive bodies which gave rise to secondary electromagnetic fields of sufficient intensity to influence the direction-finding apparatus, with primary fields of both high and low frequency, indicating that the mineralization in these particular ore bodies is fairly continuous or massive. The lighter lines 141, on the other hand, designate ore bodies which, when energized with high frequency current, produced secondary fields of sufficient strength to influence the direction-finding apparatus and give indications of the character above described as to the location of such ore bodies, but which, when energized by the primary field of relatively low frequency, produces secondary fields of insufficient intensity to noticeably influence the direction-finding apparatus or to influence the same very feebly. The absence or weakness of secondary fields surrounding these conductors at the time of low frequency primary field indicates that the same have a poor electrical conductivity at such low frequency and hence leads to the conclusion that these ore bodies are of a disseminated or broken mineralization.

The effect of a break or fault in an ore body is illustrated in Figs. 18 to 20 inclusive, in which a fault 145 exists in the ore body 146. At the plane of such fault there is a break in the conductive medium of which the ore body is composed, it being understood that the portions of the ore body at opposite sides of the fault plane do not generally make good electrical contact with one another, due, for example, to deposition of material of relatively low conductivity therebetween. However, there is an electrical capacity between the masses of ore at opposite sides of the fault plane and the electrical characteristics of such a fault are shown in Fig. 19. The resistances 146' indicate the relatively low resistance of the ore body at either side of the fault plane, while the resistance 145' indicates the relatively high resistance across the fault plane, while the capacity across such plane is indicated at 145''. It is evident that under these conditions, if the transmitting loop 1 is set up at some such position as shown, so that the lines of force of the primary field cut principally only that portion of the ore body lying to the left of the fault plane in Fig. 18, while the direction-finding apparatus 42 is set up at such a position as to be effected only by a secondary field resulting from current flow in the portion of the ore body to the right of such fault plane, then, in the case of a high frequency primary field, the current flow in the ore body will readily pass the fault plane due to the low capacity reactance thereof at such frequency and such current flow induced by the lines of force cutting the conductor at the left of the fault plane will extend throughout both portions of the ore body with substantially undiminished intensity. In this case, therefore, indications of the secondary field surrounding the ore body will be readily received with the direction-finding apparatus in the position shown.

If, on the other hand, a low frequency primary field be employed, the current induced thereby in the left hand portion of the ore body will be substantially prevented from flowing across the fault plane due to the high capacity reactance thereof at this frequency, together with its high resistance, so that there will be little or no secondary field about the right hand portion of the ore body and the direction-finding apparatus will fail to be influenced thereby in the position shown. By varying the positions of the energizing apparatus and the direction-finding apparatus along the axis of the ore body, some position such as indicated at 148 in Fig. 20 will be found, such that if the transmitting and direction-finding devices are both set up at the same side of this position, indications of a secondary field surrounding the ore body will be obtained at both high and low frequency, while if said devices are set up at opposite sides of such position, such indications will be received at high frequency, but will either fail to be received or will be received at reduced intensity in the case of a low frequency field. The position 148, therefore, indicates the probable location of a break or fault in the ore body.

The above description of the preferred mode of carrying out my invention is directed to an "inductive method" as above defined, but it is also understood that my invention in its broadest aspect includes the use of two surveys at widely differing frequencies, regardless of the method used for causing the flow of current in the ore body. For example, such flow of current may be caused by direct conduction through the earth. For this purpose, two contact members or electrodes are placed in contact with the earth, as by inserting them in the ground, at points spaced apart sufficiently to cause the current flow to penetrate or spread to the desired depth, and alternating potential difference, first of one of the frequencies to be employed, and then of the other frequency, is applied to said electrodes. This causes a flow of current through the earth between the electrodes, and in case any ore body of relatively high conductivity is present at not too great a depth, such current flow will be greater therein than in the surrounding material, resulting as before in the creation of an electromagnetic field surrounding the axis of the ore body. The presence and direction of such an electromagnetic field may be determined by suitable direction-finding receiving means, and the location of the ore body thus determined, in well known manner.

In any case, the method of my invention consists essentially in conducting two electrical surveys of the region to be explored, one at a relatively high frequency, and one at a relatively low frequency, and comparing the results of these two surveys to obtain information regarding the character of the ore bodies located. More specifically, the invention comprises causing relatively high frequency and relatively low frequency current to flow at different times in an ore body, and noting the effect, and comparing the intensity of the electromagnetic fields set up by such current flow at the respective frequencies employed.

I claim:

The method of determining the location of a fault or break in an ore body which comprises inducing current flow in said ore body by causing the same to cut by a primary electromagnetic field, noting the effect at points removed from the source of said electromagnetic field in a direction lengthwise of the ore body of the secondary electromagnetic field produced by such induced current flow, causing the primary electromagnetic field to have at different times a relatively low frequency and a relatively high frequency, varying the position of the source of the primary field and the point of noting the effect of the secondary field and noting in each case the relative effect of the secondary field for each frequency of primary field, and thus locating a position such that if the source of the primary field and the point of noting the effect of the secondary field are at the same side of such position the secondary field is of noticeable intensity at both high and low frequency, while if said source and point are at opposite sides of such position the secondary field at low frequency is either not noticeable or is of much less intensity than at high frequency.

In testimony whereof I have hereunto subscribed my name this 13th day of August, 1928.

JOHN J. JAKOSKY.